C. H. HORTON.
MOLD SCRAPER.
APPLICATION FILED DEC. 23, 1915.
1,210,318.
Patented Dec. 26, 1916.
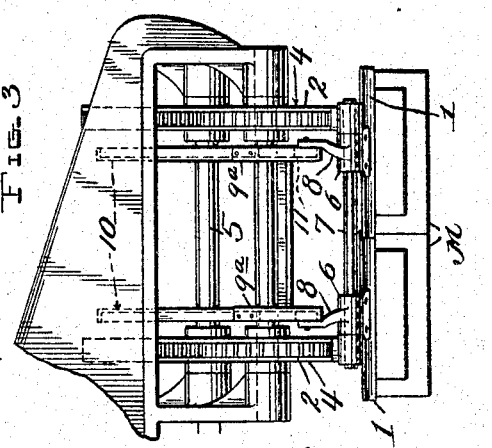
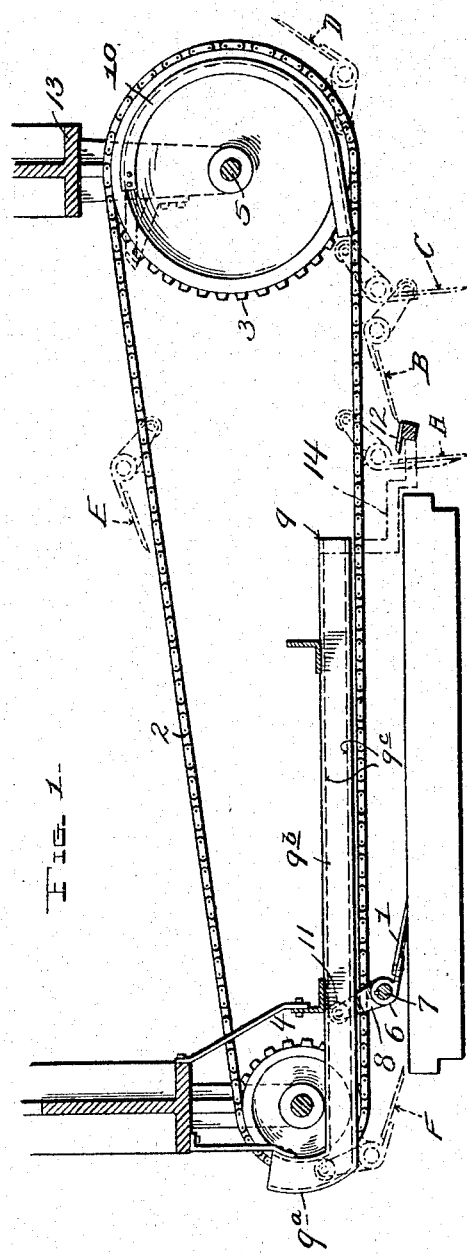
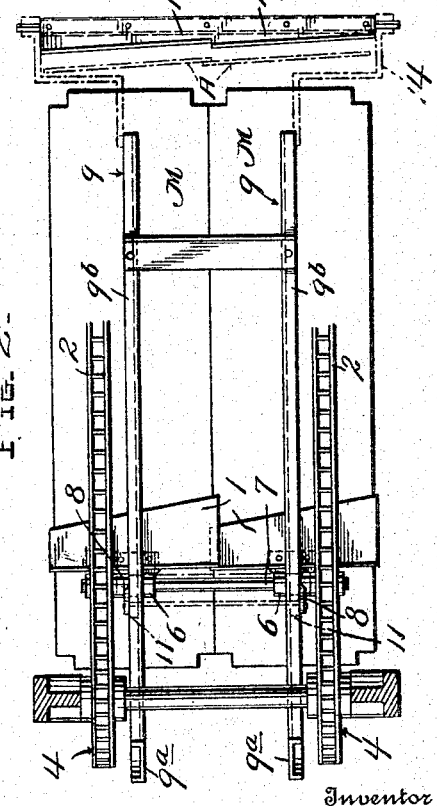
Witnesses
Inventor
Charles H. Horton
By
Attorney

UNITED STATES PATENT OFFICE.

CHARLES H. HORTON, OF PAINESVILLE, OHIO.

MOLD-SCRAPER.

1,210,318.  Specification of Letters Patent.  Patented Dec. 26, 1916.

Original application filed March 19, 1915, Serial No. 15,547. Divided and this application filed December 23, 1915. Serial No. 68,404.

*To all whom it may concern:*

Be it known that I, CHARLES H. HORTON, a citizen of the United States, residing at Painesville, in the county of Lake and State of Ohio, have invented new and useful Improvements in Mold-Scrapers, of which the following is a specification.

This application is a division of my co-pending application for patent on brick machines, Serial No. 15,547, filed March 19, 1915.

This invention relates to improvements in mold scrapers, proposing a mechanism which is specially designed to act on a continuous chain of molds and which reliably removes surplus clay from the molds.

The principal objects of the invention are to provide a mechanism, as stated, which reliably and certainly removes surplus clay from the molds and smooths off or levels the exposed faces of the bricks; in which the scraping elements are kept clean so that they shall efficiently discharge their functions; in which the actions of the scraping elements are positively controlled or effected; and which is of extremely simple and durable structural character.

An embodiment of the invention is illustrated in the accompanying drawings, wherein:—

Figure 1 is a detail side elevation of a mold scraper in which the features of the invention are incorporated; Fig. 2 is a partial plan view thereof; and Fig. 3 is an end elevation thereof.

Similar characters of reference designate corresponding parts throughout the several views.

In the embodiment disclosed, it is assumed that the molds M are arranged in a continuous chain and are movable intermittently in a direction at right angles to the direction of movement of the scrapers 1.

The mold carrier and the means for intermittently operating the carrier are not illustrated, since these elements are not parts of the present invention, and in so far as the mold scraping mechanism is concerned, may be of any suitable construction for the purposes in view. It is noted, however, that a mold carrier and an operating means therefor adapted to the embodiment of mold scraping mechanism disclosed, is fully illustrated and described in my co-pending application referred to.

The scrapers 1 are formed of thin metal plates and have obliquely disposed working edges to produce a shearing action. The scrapers, of which two arranged end to end are employed in the embodiment shown for action simultaneously upon two adjoining molds, are movable lengthwise of the molds but crosswise of the train of molds, preferably by an endless carrier including parallel sprocket chains 2. The chains 2 are trained over pairs of sprocket wheels 3 and 4 and are driven by the application of power to the shaft of one of the pairs of sprocket wheels, preferably the shaft 5 of the sprocket wheels 3.

The scrapers 1 project from collars 6 which are mounted for lengthwise adjustment on a bar 7 extending between and supported from the chains 2, the bar 7 being rotatable in its bearings. The positions of the scrapers with reference to the bar 7 as a pivotal axis are controlled by arms 8 projecting from said bar at a suitable angle to the scrapers and co-acting with cam rails 9 and 10. The arms 8 have friction rollers 11 which engage said rails. The rails 9 each include a curved portion $9^a$ concentric to the sprocket wheels 4 and a straight portion $9^b$ projecting toward the sprocket wheels 3 for a distance approximately equal to the length of each mold. The rails 9 control the action of the scrapers upon the molds, causing them to assume operative positions in horizontal or substantially horizontal planes wherein their scraping edges work uniformly throughout the width of each mold to remove surplus clay from the tops of the molds.

The operation of the scrapers will best be understood by reference to Fig. 1. After the scrapers pass beyond the molds and the arms 8 disengage the rails 9, the scrapers drop by gravity with reference to the bar 7 as a pivotal axis into a substantially perpendicular position, as shown by the dotted lines A, and thereafter in the course of the movement of the chains 2 strike against fixed transverse blades 12, one for each scraper, the function of which is to remove from the scrapers the clay which the scrapers have previously removed from the tops of the molds, the clay thus scraped from the scrapers by the blades 12 being recovered in any suitable manner and being returned to the pug mill for reworking.

The scrapers ride over the blades 12 as shown by the dotted lines B, and as soon as they have passed said blades again drop into perpendicular positions, as shown by the dotted lines C. Thereafter, their arms 8 engage the rails 10 which are curved concentrically to the sprockets 3 and which, during the movement of the scrapers through the curved path described by said sprockets, cause the scrapers to assume such positions, as shown at D, that when the scrapers pass beyond the upper sides of the sprockets 3 they rest by gravity upon the chains 2, as shown at E, in such positions that the arms 8 may engage the curved portions 9ª of the rails 9 in the course of the movement of the scrapers through the path described by the sprockets 4, the rails 9 causing the scrapers to assume their operative positions F. The straight portions 9ᵇ of the rails 9 are provided with laterally opening channels 9ᶜ in which engage the friction rollers 11 of the arms 8, the office of these channels being to coöperate with said friction rollers in positively holding the scrapers 1 in their proper working positions and to insure that the edges of the scrapers will bear with the requisite pressure against the upper surfaces of the molds through the movement of the scrapers across the molds.

A single pair of scrapers 1 are shown in the drawings to promote clearness of illustration, but it will be understood that the chains 2 may carry several pairs of such scrapers, the number being dependent on the length of said chains and on the number of pairs of molds which pass under the chains during each cycle of movement thereof.

As shown, the rails 9 and 10 are supported from brackets 13, which may be suitably secured to the machine frame, (not shown) and which also carry the bearings for the shafts of the sprocket wheels 3 and 4. The bar which carries the blades 12 may be supported by brackets 14 which are connected to the rails 9.

Having fully described my invention, I claim—

1. A mold scraping mechanism comprising movable chains traveling in a horizontal path, scraping blades carried by said chains and pivotally mounted on transverse axes whereby said blades assume perpendicular positions when they have passed beyond the molds, and fixed means engaging the blades in the perpendicular positions thereof for scraping clay therefrom, the blades yielding on their pivotal axes to pass said means.

2. A mold scraping mechanism comprising movable endless chains, blades having scraping edges, bars supported by and extending transversely between the chains and upon which the blades are mounted, arms projecting from the bars, and rails which engage said arms during periods of their movement to regulate the angular disposition of the blades.

3. A mold scraping mechanism comprising movable endless chains, blades having scraping edges, bars supported by and extending between the chains and upon which the blades are mounted, arms projecting from the bars, a fixed scraper which is engaged by the blades subsequent to the operation thereof and which removes clay therefrom, rails which are engaged by said arms to positively and operatively position the blades during a period of the movement of said chains, said rails having upwardly directed curved portions at their outer ends, and other rails distant from said first-named rails and located beyond said scraper, said last-named rails conforming in curvature to the arc through which the chains travel beyond said scraper and also being engaged by said arms whereby to regulate the angular disposition of the blades during their movement from the lower to the upper run of said chains, the blades resting on said chains throughout the upper run thereof.

4. A mold scraping mechanism comprising blades having scraping edges, a carrier therefor, and means engaging said blades during a period of the movement of said carrier for removing clay therefrom.

In testimony whereof I have hereunto set my hand in presence of two subscribing witnesses.

CHARLES H. HORTON.

Witnesses:
FRANK L. KERR,
INA M. STORY.

Copies of this patent may be obtained for five cents each, by addressing the "Commissioner of Patents, Washington, D. C."